United States Patent
Berke et al.

(10) Patent No.: US 10,339,088 B2
(45) Date of Patent: Jul. 2, 2019

(54) SYSTEM AND METHOD TO BLACKLIST EQUALIZATION COEFFICIENTS IN A HIGH-SPEED SERIAL INTERFACE

(71) Applicant: Dell Products, LP, Round Rock, TX (US)

(72) Inventors: Stuart Allen Berke, Austin, TX (US); Bhyrav M. Mutnury, Round Rock, TX (US)

(73) Assignee: Dell Products, LP, Round Rock, TX (US)

( * ) Notice: Subject to any disclaimer, the term of this patent is extended or adjusted under 35 U.S.C. 154(b) by 151 days.

(21) Appl. No.: 14/868,322

(22) Filed: Sep. 28, 2015

(65) Prior Publication Data
US 2017/0091137 A1    Mar. 30, 2017

(51) Int. Cl.
*G06F 13/42* (2006.01)
*G06F 13/368* (2006.01)

(52) U.S. Cl.
CPC ........ *G06F 13/4282* (2013.01); *G06F 13/368* (2013.01)

(58) Field of Classification Search
CPC ....................................................... G06F 19/34
See application file for complete search history.

(56) References Cited

U.S. PATENT DOCUMENTS

| | | | | |
|---|---|---|---|---|
| 7,379,124 B2* | 5/2008 | George | ............ | H04N 9/28 348/189 |
| 7,599,431 B1* | 10/2009 | Anderson | ........ | H04L 25/03038 375/229 |
| 7,915,923 B1* | 3/2011 | Yeung | ............ | H04L 25/0264 326/82 |
| 8,243,782 B2 | 8/2012 | Mobin et al. | | |
| 8,516,595 B2* | 8/2013 | Oro Garcia | ........ | H04L 63/1425 726/23 |
| 2008/0304559 A1 | 12/2008 | Wu et al. | | |
| 2010/0329325 A1* | 12/2010 | Mobin | ........ | H04L 25/03343 375/232 |

FOREIGN PATENT DOCUMENTS

EP    1 643 678 A1    5/2006

* cited by examiner

*Primary Examiner* — Steven G Snyder
*Assistant Examiner* — Juanito Borromeo
(74) *Attorney, Agent, or Firm* — Larson Newman, LLP (57) ABSTRACT

A serial interface comprises a receiver including a first input compensation module with a first setting that selects a first value from among a plurality of first values for a first input characteristic of the receiver, a memory to store a first blacklist value from among the first values, and a control module to select each of the first values, except for the first blacklist value, to evaluate an indication of a performance level of the receiver for each of the selected first values, and to select a particular first value based upon the indications of the performance level of the receiver.

20 Claims, 6 Drawing Sheets

SYSTEM AND METHOD TO BLACKLIST EQUALIZATION COEFFICIENTS IN A HIGH-SPEED SERIAL INTERFACE

FIELD OF THE DISCLOSURE

This disclosure generally relates to information handling systems, and more particularly relates to a system and method to blacklist equalization coefficients in a high-speed serial interface.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

As the speed of serial interfaces increases, variations in circuit design, component manufacture, environmental conditions, and other factors make it increasingly difficult to ensure highly reliable data transmission. In particular, transmitter and receiver equalization mechanisms to compensate for channel loss are calibrated on a best-effort basis, where settings that result in a "good enough" compensation solution are quickly obtained, in favor of iterative processes that might yield a more optimal solution, but which require an inordinate amount of time for such link training.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
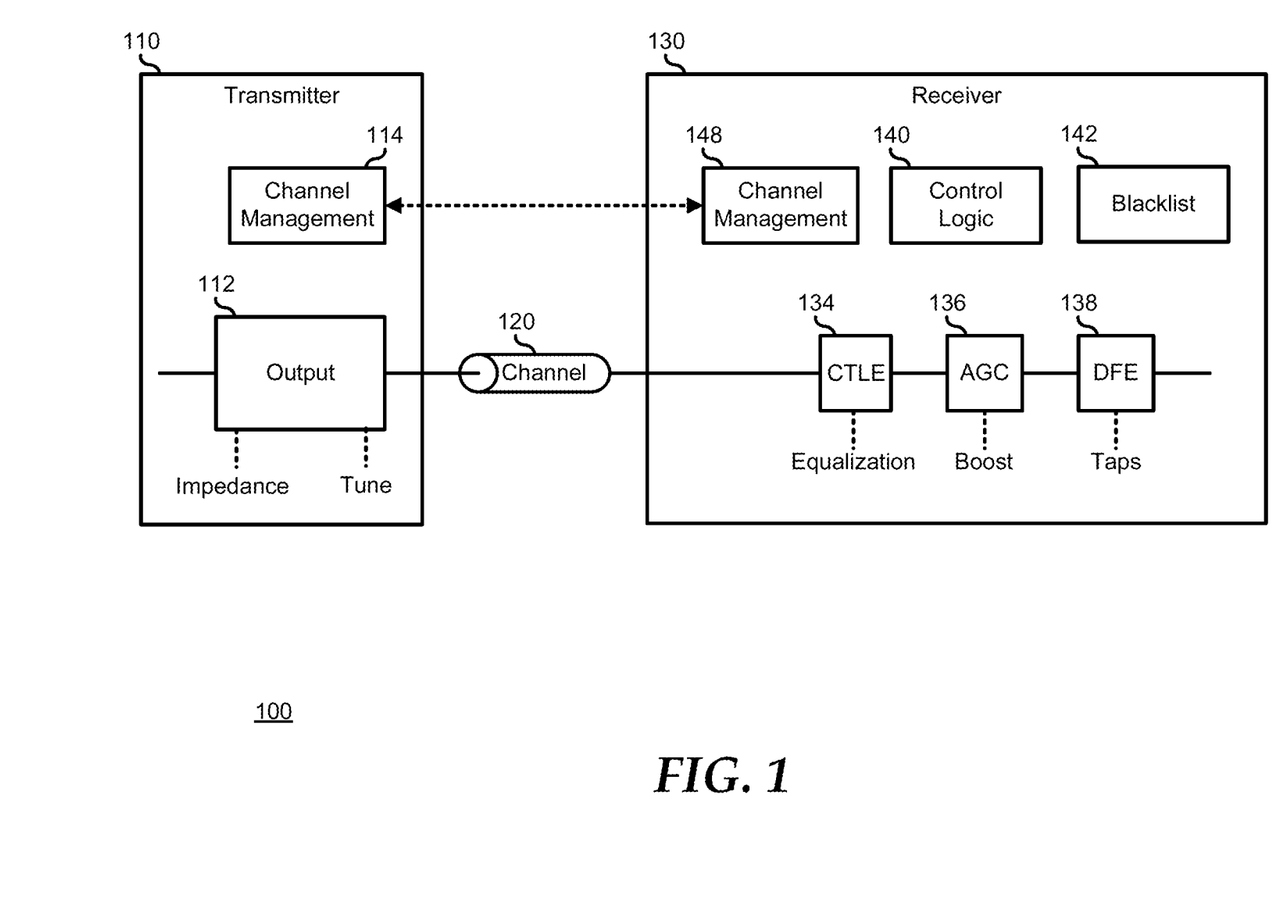
FIG. 1 illustrates a high speed serial interface according to an embodiment of the present disclosure.

FIG. 1 illustrates an embodiment of a high speed serial channel 100 of an information handling system. For the purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, an information handling system can include processing resources for executing machine-executable code, such as a central processing unit (CPU), a programmable logic array (PLA), an embedded device such as a System-on-a-Chip (SoC), or other control logic hardware. An information handling system can also include one or more computer-readable medium for storing machine-executable code, such as software or data. Additional components of an information handling system can include one or more storage devices that can store machine-executable code, one or more communications ports for communicating with external devices, and various input and output (I/O) devices, such as a keyboard, a mouse, and a video display. An information handling system can also include one or more buses operable to transmit information between the various hardware components.

Serial channel 100 includes a transmitter 110, a transmission channel 120, and a receiver 130. Serial channel 100 represents one half of a bi-directional serial data link for communicating data from transmitter 110 located at a first component to receiver 130 located at a second component. The other half of the bi-directional serial data link is similar to serial channel 100, but with a receiver in the first component, and a transmitter in the second component, for communicating data back from the second component to the first component. Here, the components can be understood to include elements within an information handling system, such as components that are attached to one or more printed circuit board of the information handling system, where transmission channel 120 can represent one or more circuit traces on the printed circuit board, and can include one or more connectors. The components can also be understood to include devices of an information handling system, such as a hard drive, a storage array, and the like, that are separate from the printed circuit board of the information handling system, where transmission channel 120 can include one or more transmission cables. An example of serial channel 100 includes a PCI-Express (PCIe) channel that is in compliance with one or more PCIe specification, up to, and including the PCIe 3.1 Specification, a Serial ATA (SATA) channel that is in compliance with one or more SATA specification, up to, and including the SATA 3.2 Specification, a SAS channel that is in compliance with one or more SAS specification, up to and including the Serial Attached SCSI 4.0 Standard, or another high speed serial channel.

Serial channel 100 operates to provide back channel adaptation where transmitter 110 and receiver 130 communicate with each other to optimize and adjust various compensation values within the transmitter and the receiver to compensate for the insertion loss and other signal degradations of transmission channel 120. A determination is made as to whether or not a set of compensation values is satisfactory. In a particular embodiment, the determination is based upon the bit error rate (BER) associated with the set of values. In another embodiment, the determination is based upon the characteristics of the receiver eye pattern for the transmitted signals. It is possible for multiple different sets of compensation values to result in acceptable BER or receiver eye characteristics in serial channel 100. Moreover, even on a particular information handling system, operating at different times, the back channel adaptation mechanism may operate to provide different sets of compensation values based upon minute variations in the operating condition of the information handling system. As such, serial channel 100 operates to adjust an output impedance of transmitter 110 and to repeatedly perform the back channel adaptation, recording the set of compensation values for each iteration of the back channel adaptation at each impedance setting, in order to determine a best impedance setting, as described below. Then serial channel 100 further operates to use the best impedance setting for subsequent iterations of the back channel adaptation.

Transmitter 110 includes a channel output module 112 and a channel management module 114. Channel output module 112 includes an impedance setting and a tuning setting. The impedance setting operates to select a target impedance for the output of receiver 110. For example, the impedance setting can operate to select a 25 ohm output impedance, a 40 ohm output impedance, a 50 ohm output impedance, a 75 ohm output impedance, or another output impedance selected to match an impedance of transmission channel 120, as needed or desired. The tuning setting operates to select a fine tuning of the output impedance of transmitter 110 around the nominal impedance selected by the impedance setting. In a particular embodiment, the tuning setting provides a low impedance adjustment setting, a nominal setting, and a high impedance adjustment setting. For example, the low impedance adjustment setting can decrease the output impedance of channel output module 122 by a particular impedance value or percentage, and the high impedance adjustment setting can increase the output impedance of channel output module 122 by a particular impedance value or percentage. In another embodiment, the tuning setting provides more or less than three impedance adjustment settings, as needed or desired. Channel management module 114 will be described below.

Receiver 130 includes a continuous time linear equalization (CTLE) module 134, an automatic gain control (AGC) module 136, a decision feedback equalization (DFE) module 138, a control logic module 140, and a channel management module 148. In operation, serial data is received from transmitter 110, the received signal is provided to CTLE module 134, and the CTLE module operates to provide compensation for inter-signal interference (ISI) in order to open the signal eye of the received signal. The amount of compensation is determined based upon an equalization setting. For example, receiver 130 can support 21 equalization settings which each prescribe a different amount of equalization, from 0 dB to 10 dB, in 0.5 dB steps. Other numbers of settings and amounts of equalization prescribed by the equalization setting can be utilized, as needed or desired The equalized signal is provided from CTLE module 134 to AGC module 136. AGC module 136 operates to provide linear gain to the signal received from CTLE module 134 to further open the signal eye of the received signal. The amount of gain is determined by a gain setting, and can support 21 gain settings which each prescribe a different amount of gain, for example, from 0 dB to 10 dB, in 0.5 dB steps. Other numbers of settings and amounts of gain prescribed by the gain setting can be utilized, as needed or desired.

The amplified signal is provided from AGC module 136 to DFE module 138. DFE module 138 operates to provide feedback based compensation to the received signal. The amount of compensation is determined by enabling a number of circuit feedback taps. For example, DFE module 138 can support up to 16 taps that provide compensation based upon up to 16 previous data points. In a particular embodiment, DFE module 138 can be turned off, thereby reducing the power consumed by receiver 130. In another embodiment, one or more tap of DFE module 138 can be turned on based upon the taps setting, while the rest of the taps are placed into a tri-state condition, that is, with power applied, but with the taps not providing feedback to the resultant DFE compensation. In yet another embodiment, one or more tap of DFE module 138 can be turned on based upon the taps setting, while the rest of the taps are turned off, thereby reducing the power consumed by receiver 130. Other numbers of taps can be utilized, as needed or desired.

In operation, the impedance setting of channel output module 112 is set based upon a design target for transmission channel 120. For example, if transmission channel 120 is designed as a 25 ohm transmission channel, then the impedance setting is set to the 25 ohm setting, and so forth. Control logic module 140 operates to direct transmitter 110 to set the tuning setting to the minimum offset setting, such as a minus one ohm setting. Control logic module 140 communicates with transmitter 110 via a communication channel established between channel management module 114 and channel management module 148. In a particular embodiment, management module 114 and channel management module 148 represent a separate side-band communication channel for communicating adaptation instructions between transmitter 110 and receiver 130. For example, the communications between channel management module 114 and channel management module 148 can include a third party device or mechanism that provides system management for an information handling system that includes serial channel 100, such as a Baseboard Management Controller (BMC), an Integrated Dell Remote Access Controller (IDRAC), or another embedded controller, as needed or desired. In another embodiment, management module 114 and channel management module 148 represent management traffic between transmitter 110 and receiver 130 that is communicated over transmission channel 120 and an additional transmission channel from receiver 130 to transmitter 110.

With the tuning setting of channel output module 112 set to the minimum offset setting, control logic module 114 runs through the various combinations of settings for the equalization setting, the gain setting, and the taps setting, recording for each combination, an associated eye height or an associated BER, as needed or desired. Control logic module 140 directs transmitter 110 to select a next tuning setting of channel output module 112 and repeats the process of recording the associated eye height or BER for each of the various combinations of settings. Control logic module 140 continues the process of recording the associated eye height or BER for all tuning setting of channel output module 112. Based upon the recorded eye heights or BERs, control logic module 140 determines a best tuning setting, and directs transmitter 110 to set the tuning setting to the best setting. Then, in subsequent iterations of back channel adaptations, transmitter 110 is set to provide the optimal performance for transmission channel 120. A method for determining the best tuning setting is described below.

Figure 2:
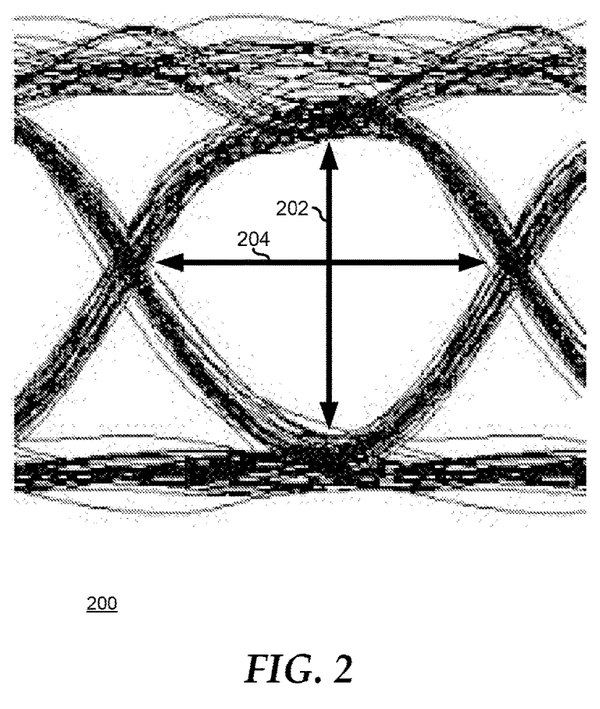
FIG. 2 illustrates a receiver eye diagram for the serial interface of FIG. 1.

FIG. 2 illustrates an exemplary receiver eye diagram 200 for serial channel 100. Receiver eye diagram 200 shows an eye height 202 and an eye width 204. Serial channel 100 can be specified such that the received signal exhibits eye height 202 as being greater than or equal to a specified eye height and such that the received signal exhibits an eye width 204 as being greater than or equal to a specified eye width.

Figure 3:
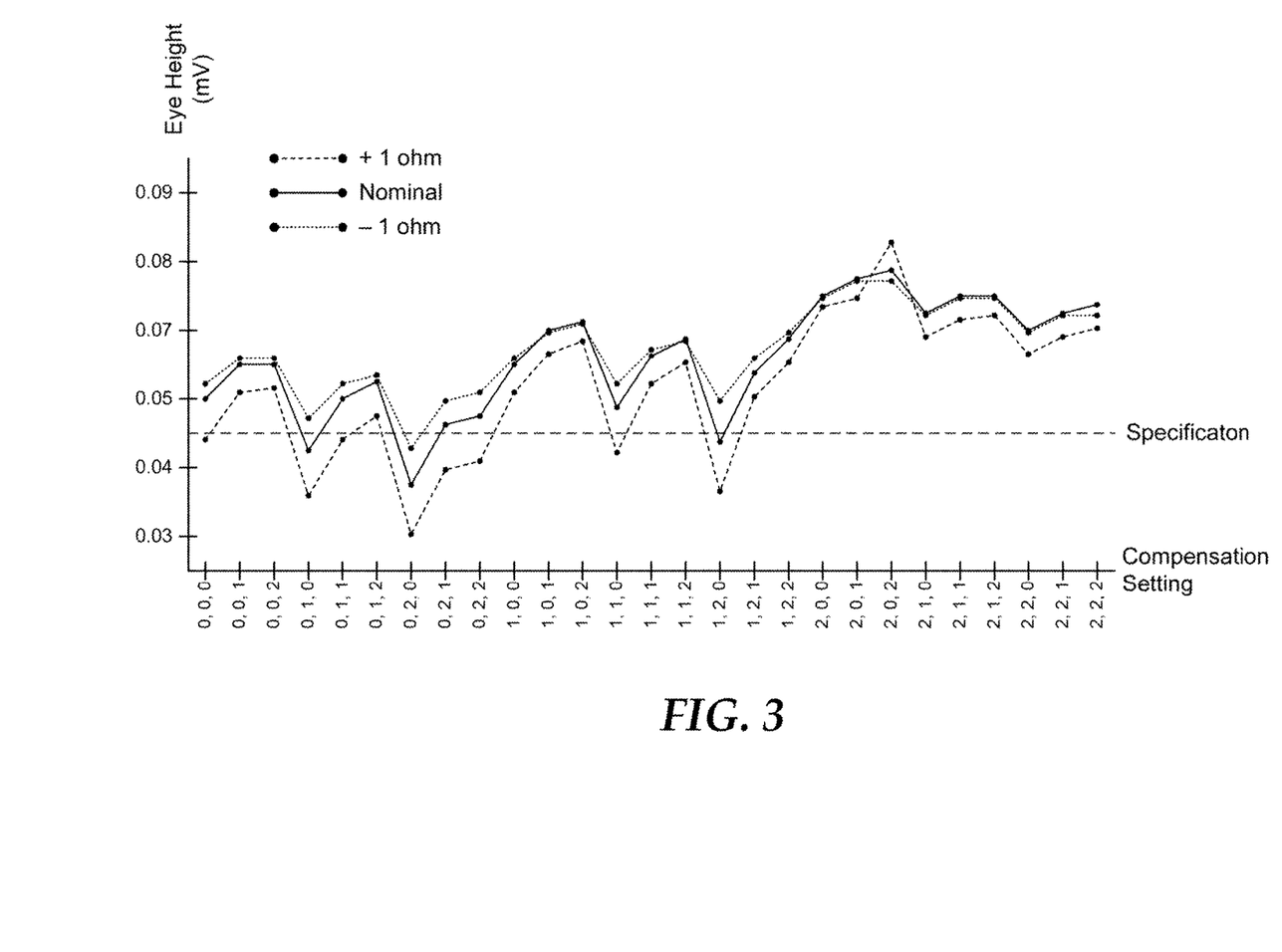
FIG. 3 is a graph illustrating a determination of a best impedance tuning setting in the serial interface of FIG. 1.

FIG. 3 illustrates a graph of the exemplary results of various eye height measurements. Here, it is assumed for the sake of simplicity that CTLE module 134 has three equalization settings (0, 1, and 2), that AGC module 136 has three gain settings (0, 1, and 2), that DFE module 138 has three tap settings (0, 1, and 2), and that channel output module 112 has three settings (−1 ohm, nominal, and +1 ohm). Here, the equalization settings for receiver 130 are shown in the various combinations along the x-axis of the graph, where (x, y, z) represents a particular combination of settings. For example, the x-value can represent the equalization setting value, the y-value can represent the gain setting value, and the z-value can represent the taps setting value. The eye heights are marked for each tuning setting for channel output module 112. Thus, a first line illustrates the eye heights for each combination of settings for the +1 ohm tuning setting, a second line illustrates the eye heights for each combination of settings for the nominal tuning setting, and a third line illustrates the eye heights for each combination of settings for the −1 ohm tuning setting.

The y-axis of the graph shows the recorded eye height in mili-volts (mV). The graph also illustrates a threshold value that represents a specified minimum eye height at 0.045 mV. In a particular embodiment, the best tuning setting is determined by the line that includes the highest eye height. Here, because the receiver setting of (2, 0, 2) produces a maximum eye height of around 0.0825 mV with the +1 ohm tuning setting, then the +1 ohm tuning setting is determined to be the best setting. In another embodiment, the setting that results in the lowest number of failing eye heights is determined to be the best tuning setting. Here, because the −1 ohm tuning setting only results in three failing setting combinations, the −1 ohm tuning setting is determined to be the best setting. In another embodiment, the best tuning setting is determined as the setting that produces the highest average eye height. In another embodiment, the best tuning setting is determined as the setting that results in a lowest standard deviation of the eye heights. In yet another embodiment, a combination of the above described criteria for determining the best tuning setting is employed, or another criteria is utilized, as needed or desired.

Figure 4:
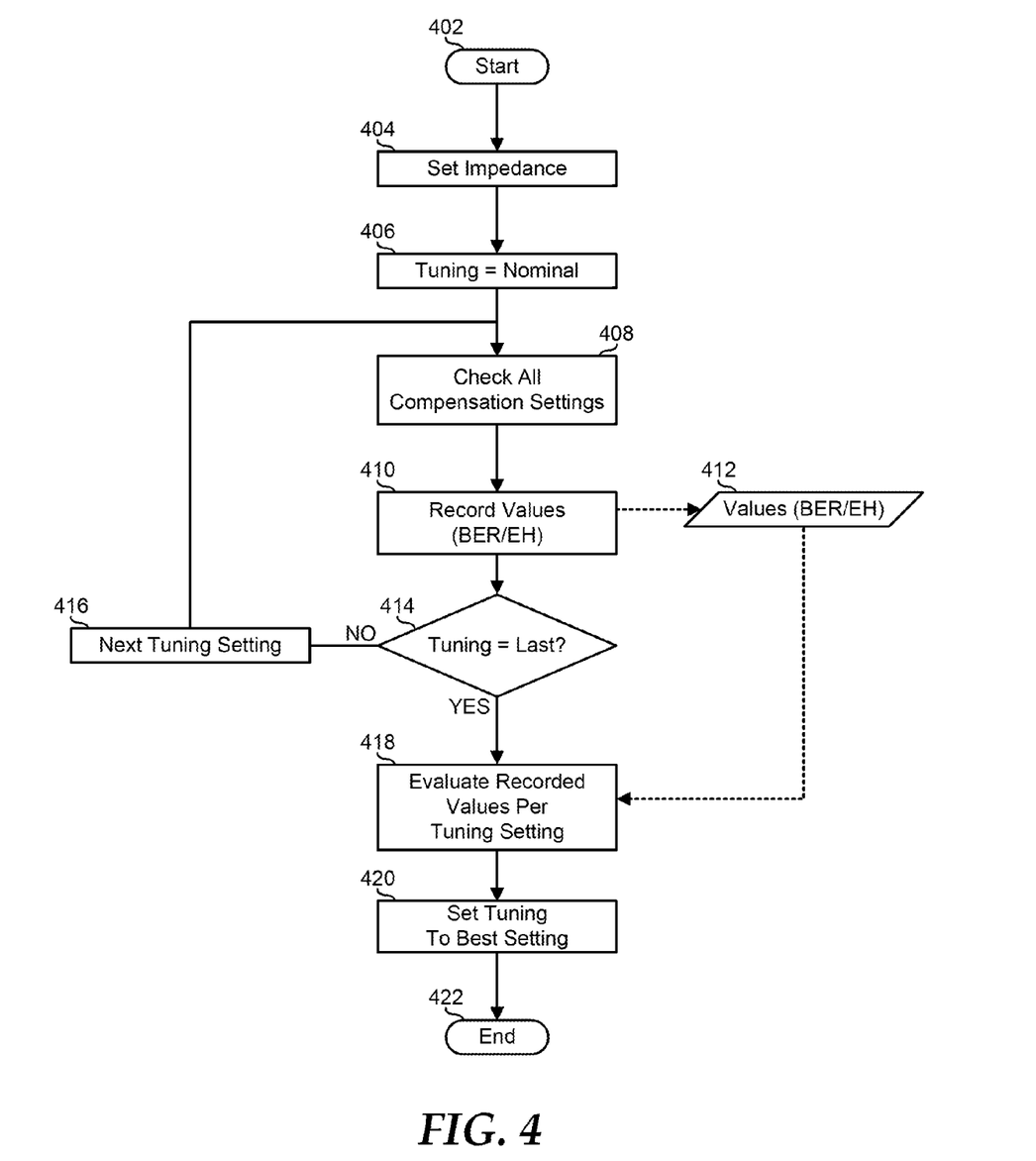
FIG. 4 is a flowchart illustrating a method of determining an impedance tuning setting in a serial interface according to an embodiment of the present disclosure.

FIG. 4 illustrates a method of determining an impedance tuning setting in a serial interface, starting at block 402. An impedance for a transmitter is set in block 404. For example, the impedance setting of channel output module 112 can be selected to match the design impedance of transmission channel 120. A tuning setting for the transmitter is set to nominal in block 406. For example, the tuning setting of channel output module 112 can be set to the nominal setting. The various combinations of compensation settings are selected in block 408, and a measurement of the value at each combination is recorded in block 410. For example, the 27 combinations of compensation settings as described in FIG. 3, above, can be selected, and a BER or an eye height can be measured and recorded. The skilled artisan will recognize that a method for selecting the combinations of compensation settings can include a nested loop where each combination of compensation settings is selected. The recorded values from block 410 are stored in a values database 412.

A decision is made as to whether or not the selected tuning setting is the last tuning setting in decision block 414. If not, the "NO" branch of decision block 414 is taken, the next tuning setting is selected in block 416, and the method returns to block 408 where the various compensation setting combinations are selected. If the selected tuning setting is the last tuning setting, the "YES" branch of decision block 414 is taken and the recorded values for each tuning setting are evaluated to determine the best tuning setting in block 418. For example, the best tuning setting can include one or more of the tuning setting that included the combination of compensation settings that provided the maximum eye height or the minimum BER, the tuning setting that included the fewest number of combinations of compensation settings that failed a particular criteria, the tuning setting that included the highest average eye height or the lowest average BER, or another criteria, as needed or desired. The recorded values are derived from values database 412. The transmitter is set to the best tuning setting in block 420 and the method ends in block 422.

In a particular embodiment, serial channel 100 includes an equalization coefficient blacklist 142. Serial channel 100 can exhibit sensitivity such that small changes in the equalization settings results in large changes in the received signal, and can lead to unacceptable eye heights and eye widths. In a particular embodiment, certain equalization coefficient settings or combinations of equalization coefficient settings are known to produce one or more of an unacceptable eye height or an unacceptable eye width, and such known unacceptable coefficient settings or combinations of coefficient settings are stored in equalization coefficient blacklist 142. Here, serial channel 100 operates such that, in determining an impedance tuning setting for the serial interface, the unacceptable coefficient settings or combinations of coefficient settings stored in equalization coefficient blacklist 142 are skipped or otherwise eliminated from the determination algorithm. In a particular embodiment, the known unacceptable coefficient settings or combinations of coefficient settings can be determined based upon knowledge gained during the design, development, or manufacturing of serial channel 100, and are stored in equalization coefficient blacklist 142 prior to installation into an information handling system.

In another embodiment, other unacceptable coefficient settings or combinations of coefficient settings can be determined based upon knowledge gained during normal operation of serial channel 100. Here, control logic 140 tracks when a particular coefficient setting or combination of coefficient settings that was determined to be acceptable has subsequently become unacceptable, and can add the newly determined unacceptable coefficient setting or combination of coefficient settings to equalization coefficient blacklist 142. For example, control logic 140 can include a counter that is associated with a particular coefficient setting or combination of coefficient settings, and can track the number of times that such a coefficient setting or combination of coefficient settings becomes unacceptable. If the number exceeds a pre-determined threshold, then control logic 140 can add the coefficient setting or combination of coefficient settings to the blacklist. In another embodiment, determination of a blacklist coefficient setting or combination of coefficient settings may automatically cause additional blacklist coefficient settings or combinations of settings to become blacklisted based on correlation, statistics, or other knowledge gained through design, development, manufacturing, or during normal operation.

Following is a pseudo-code example for determining an impedance tuning setting in a serial interface using a blacklist as described above. The serial interface includes 4 PHY parameters that are varied during training;

```
//    Para1 = Tx De-emphasis, 5 possible values V11 though V15
//    Para2 = Rx VGA, 7 possible values V21 though V27
//    Para3 = Rx CTLE/AEQ, 9 possible values V31 though V39
//    Para4 = Rx DFE, 6 possible values V41 though V46
//    Note that there are 5 * 7 * 9 * 6 = 1890 combinations to try.
//    Pseudo-code for a nest loop over all 4 parameters:
      For (i = 1 to 5)
           For (j = 1 to 7)
                For (k = 1 to 9)
                     For (l = 1 to 6)
                          Is V1i AND V2j AND V3k AND V4l in the Blacklist?
                     Next l
                Next k
           Next j
      Next i
//    Example Blacklist Table:
      Entry1 = V14, V23, V38, V42    //  [Paras1-4 must all match]
      Entry2 = V24                   //  [Only Para2 must match]
      Entry3 = V26                   //  [Only Para2 must match]
      Entry4 = V33, V45              //  [Para3 and Para4 must match]
//    In this example,
//    Entry 1 Eliminates 1*1*1*1 = 1 of 1890 combinations
//    Entry 2 Eliminates 5*1*9*6 = 270 of 1890 combinations
//    Entry 3 Eliminates 5*1*9*6 = 270 of 1890 combinations
//    Entry 4 Eliminates 5*7*1*1 = 35 of 1890 combinations
//    Thus, a total of 1+270+270+35 = 576 of 1890 combinations are skipped
```

Figure 5:
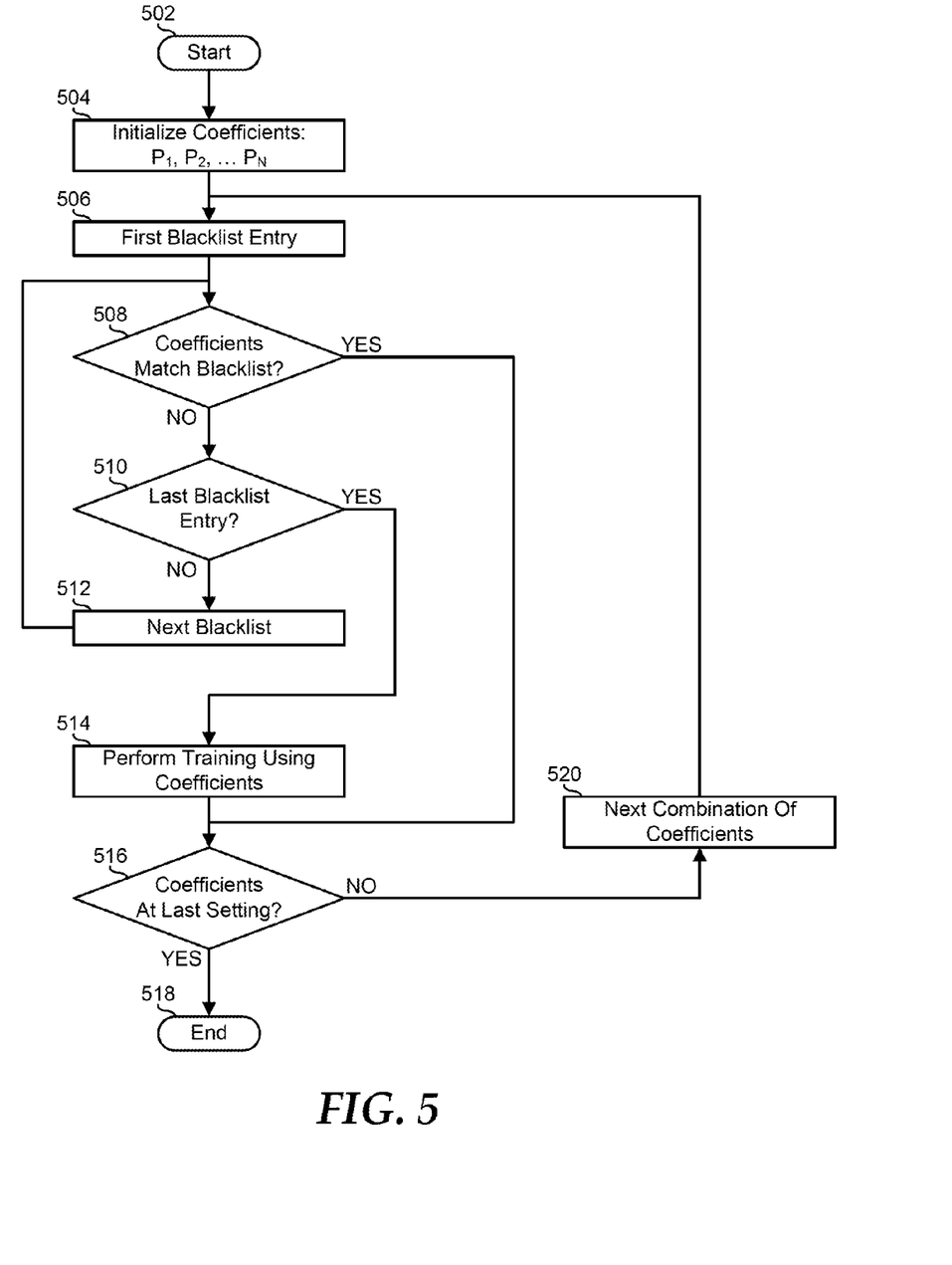
FIG. 5 is a flowchart illustrating a method to blacklist equalization coefficients in a high-speed serial interfaces according to an embodiment of the present disclosure.

FIG. 5 illustrates a method to blacklist equalization coefficients in a high-speed serial interface starting at block 502. The equalization coefficient settings for a serial channel are initialized at block 504. For example, the settings for channel output module 112, CTLE module 134, AGC module 136, and DFE module 138 can be set at their respective lowest settings, at their respective highest settings, at their respective midpoint settings, or at another set of initialization settings, as needed or desired. The first blacklist entry is selected in block 506. For example, a first blacklist entry in equalization coefficient blacklist 142 can be selected.

A decision is made as to whether or not the initialized coefficient setting matches the first blacklist entry in decision block 508. If not, the "NO" branch of decision branch 508 is taken and a decision is made as to whether or not the currently selected blacklist entry is the last blacklist entry in decision block 510. If not, the "NO" branch of decision block 510 is taken, the next blacklist entry is selected in block 512, and the method returns to decision block 508 where a decision is made as to whether or not the initialized coefficient setting matches the next blacklist entry. If the currently selected blacklist entry is the last blacklist entry, the "YES" branch of decision block 510 is taken, the serial channel is trained using the initial equalization coefficients in block 514, and the method proceeds to decision block 516, as described below.

Returning to decision block 508, if the initialized coefficient setting matches the first blacklist entry, the "YES" branch is taken and the method proceeds to decision block 516 where a decision is made as to whether or not the equalization coefficients represent the last equalization coefficient setting. If so, the "YES" branch of decision block 516 is taken and the method ends in block 518. If the equalization coefficients do not represent the last equalization coefficient setting, the "NO" branch of decision block 516 is taken, a next set of equalization coefficients is selected in block 520, and the method returns to block 506 where the first blacklist entry is selected.

Figure 6:
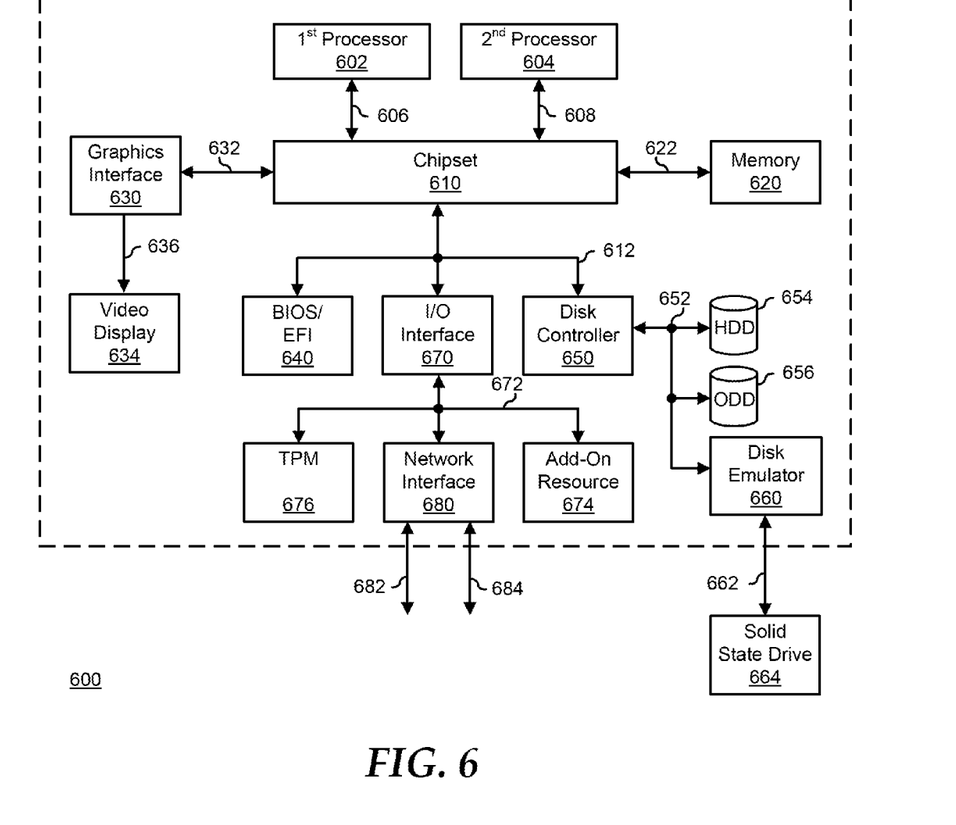
FIG. 6 is a block diagram illustrating a generalized information handling system according to an embodiment of the present disclosure.

FIG. 6 illustrates a generalized embodiment of information handling system 600. For purpose of this disclosure information handling system 600 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 600 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described above, and operates to perform one or more of the methods described above. Information handling system 600 includes a processors 602 and 604, a chipset 610, a memory 620, a graphics interface 630, include a basic input and output system/extensible firmware interface (BIOS/EFI) module 640, a disk controller 650, a disk emulator 660, an input/output (I/O) interface 670, and a network interface 680. Processor 602 is connected to chipset 610 via processor interface 606, and processor 604 is connected to the chipset via processor interface 608. Memory 620 is connected to chipset 610 via a memory bus 622. Graphics interface 630 is connected to chipset 610 via a graphics interface 632, and provides a video display output 636 to a video display 634. In a particular embodiment, information handling system 600 includes separate memories that are dedicated to each of processors 602 and 604 via separate memory interfaces. An example of memory 620 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 640, disk controller 650, and I/O interface 670 are connected to chipset 610 via an I/O channel 612. An example of I/O channel 612 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 610 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. BIOS/EFI module 640 includes BIOS/EFI code operable to detect resources within information handling system 600, to provide drivers for the resources, initialize the resources, and access the resources. BIOS/EFI module 640 includes code that operates to detect resources within information handling system 600, to provide drivers for the resources, to initialize the resources, and to access the resources.

Disk controller 650 includes a disk interface 652 that connects the disc controller to a hard disk drive (HDD) 654, to an optical disk drive (ODD) 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits a solid-state drive 664 to be connected to information handling system 600 via an external interface 662. An example of external interface 662 includes a USB interface, an IEEE 1394 (Firewire) interface, a proprietary interface, or a combination thereof. Alternatively, solid-state drive 664 can be disposed within information handling system 600.

I/O interface 670 includes a peripheral interface 672 that connects the I/O interface to an add-on resource 674, to a TPM 676, and to network interface 680. Peripheral interface 672 can be the same type of interface as I/O channel 612, or can be a different type of interface. As such, I/O interface 670 extends the capacity of I/O channel 612 when peripheral interface 672 and the I/O channel are of the same type, and the I/O interface translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as chipset 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A serial interface, comprising:
    a receiver including:
        a first input compensation module with a first setting that selects a first value from among a plurality of first values for a first input characteristic of the receiver, the first values including a low value, an intermediate value, and a high value;
        a memory to store a first blacklist value from among the first values; and
        a control module to receive the first blacklist value from the memory, to select each of the first values, except for the first blacklist value, to evaluate an indication of a performance level of the receiver for each of the selected first values, without evaluating the indication of the performance level of the receiver for the first blacklist value, and to select a particular first value based upon the indications of the performance level of the receiver.

2. The serial interface of claim 1:
    the memory further to store a second blacklist value of the first values; and
    the control module further to receive the second blacklist value from the memory, to select each of the first values, except for the second blacklist value, and to not evaluate an indication of the performance level of the receiver for the second blacklist value.

3. The serial interface of claim 1:
    the receiver further including a second input compensation module with a second setting that selects a second value from among a plurality of second values for a second input characteristic of the receiver;
    the memory further to store a second blacklist value from among the second values, and the control module further to receive the second blacklist value from the memory, to select each of the second values, except for the second blacklist value, to evaluate the indication of the performance level of the receiver for each of the selected second values, to not evaluate an indication of the performance level of the receiver for the second blacklist value, and to select a particular second value based upon the indications of the performance level of the receiver.

4. The serial interface of claim 1, further comprising:
    a transmitter including an output compensation module with a second setting that selects a second value from among a plurality of second values for an output characteristic of the transmitter;
    the memory further to store a second blacklist value from among the second values, and the control module further to receive the second blacklist value from the memory, to select each of the second values, except for the second blacklist value, to evaluate the indication for each of the selected second values, to not evaluate an indication of a performance level of the receiver for the second blacklist value, and to select a particular second value based upon the indications of the performance level of the receiver.

5. The serial interface of claim 4, wherein the second values selects an output impedance for the output compensation module.

6. The serial interface of claim 1, wherein the first values selects one of an equalization level for a continuous time linear equalization module, a boost level for an automatic gain control module, and a number of taps for a decision feedback equalization module.

7. The serial interface of claim 1:
    the receiver including an analog-to-digital converter module that provides a receiver eye height level, wherein the performance level comprises a receiver eye height.

8. The serial interface of claim 1, wherein the performance level comprises bit error rate.

9. A method, comprising:
    storing, at a memory of a serial interface, a first blacklist value from among a plurality of first values, the first values to select a first setting of a first input compensation module of a receiver of the serial interface to provide a first input characteristic of the receiver, the first values including a low value, an intermediate value, and a high value;
    receiving, by a control module of the serial interface, the first blacklist value from the memory;
    selecting, by the control module, each of the first values, except for the first blacklist value;
    evaluating an indication of a performance level of the receiver for each of the selected first values without evaluating the indication of the performance level of the receiver for the first blacklist value; and
    selecting a particular first value based upon the indications of the performance level of the receiver.

10. The method of claim 9, further comprising:
    storing, at the memory, a second blacklist value from among a plurality of second values, the second values to select a second setting of a second compensation module of the receiver to provide a second input characteristic of the receiver;
    receiving, by the control module, the second blacklist value from the memory;
    selecting, by the control module, each of the second values, except for the second blacklist value; and
    not evaluating an indication of a performance level of the receiver h second blacklist value.

11. The method of claim 9:
    storing, at the memory, a second blacklist value from among a plurality of second values, the second values to select a second setting of a second input compensation module of the receiver to provide a second input characteristic of the receiver;
    receiving, by the control module, the second blacklist value from the memory;
    selecting, by the control module, each of the second values, except for the second blacklist value;

evaluating the indication of the performance level of the receiver for each of the selected second values;
not evaluating an indication of a performance level of the receiver for the second blacklist value; and
selecting a particular second value based upon the indications of the performance level of the receiver.

12. The method of claim 9, further comprising:
storing, at the memory, a second blacklist value from among a plurality of second values, the second values to select a second setting of an output compensation module of a transmitter of the serial interface to provide a first output characteristic of the transmitter;
receiving, by the control module, the second blacklist value from the memory;
selecting, by the control module, each of the second values, except for the second blacklist value;
evaluating the indication of the performance level of the receiver for each of the selected second values;
not evaluating an indication of a performance level of the receiver for the second blacklist value; and
selecting a particular second value based upon the indications of the performance level of the receiver.

13. The method of claim 12, wherein the second values selects an output impedance for the output compensation module.

14. The method of claim 9, wherein the first values selects one of an equalization level for a continuous time linear equalization module, a boost level for an automatic gain control module, and a number of taps for a decision feedback equalization module.

15. The method of claim 9, further comprising:
providing, by an analog-to-digital converter module of the receiver, a receiver eye height level, wherein the performance level comprises a receiver eye height.

16. The method of claim 9, wherein the performance level comprises bit error rate.

17. A non-transitory computer-readable medium including code for performing a method, the method comprising:
storing, at a memory of a serial interface, a first blacklist value from among a plurality of first values, the first values to select a first setting of a first input compensation module of a receiver of the serial interface to provide a first input characteristic of the receiver, the first values including a low value, an intermediate value, and a high value;
receiving the first blacklist value from the memory;
selecting each of the first values, except for the first blacklist value;
evaluating an indication of a performance level of the receiver for each of the selected first values;
not evaluating an indication of a performance level of the receiver for the first blacklist value; and
selecting a particular first value based upon the indications of the performance level of the receiver.

18. The computer-readable medium of claim 17, the method further comprising:
storing a second blacklist value from among a plurality of second values, the second values to select a second setting of a second compensation module of the receiver to provide a second input characteristic of the receiver;
receiving the second blacklist value from the memory;
selecting each of the second values, except for the second blacklist value; and
not evaluating an indication of a performance level of the receiver for the second blacklist value.

19. The computer-readable medium of claim 17, the method further comprising:
storing a second blacklist value from among a plurality of second values, the second values to select a second setting of a second input compensation module of the receiver to provide a second input characteristic of the receiver;
receiving the second blacklist value from the memory;
selecting each of the second values, except for the second blacklist value;
evaluating the indication of the performance level of the receiver for each of the selected second values;
not evaluating an indication of a performance level of the receiver for the second blacklist value; and
selecting a particular second value based upon the indications of the performance level of the receiver.

20. The computer-readable medium of claim 17, the method further comprising:
storing a second blacklist value from among a plurality of second values, the second values to select a second setting of an output compensation module of a transmitter of the serial interface to provide a first output characteristic of the transmitter;
receiving the second blacklist value from the memory;
selecting each of the second values, except for the second blacklist value;
evaluating the indication of the performance level of the receiver for each of the selected second values;
not evaluating an indication of a performance level of e receiver for e second blacklist value; and
selecting a particular second value based upon the indications of the performance level of the receiver.

* * * * *